(No Model.)
E. L. MORRIS.
ADVERTISING DEVICE.
No. 253,087. Patented Jan. 31, 1882.
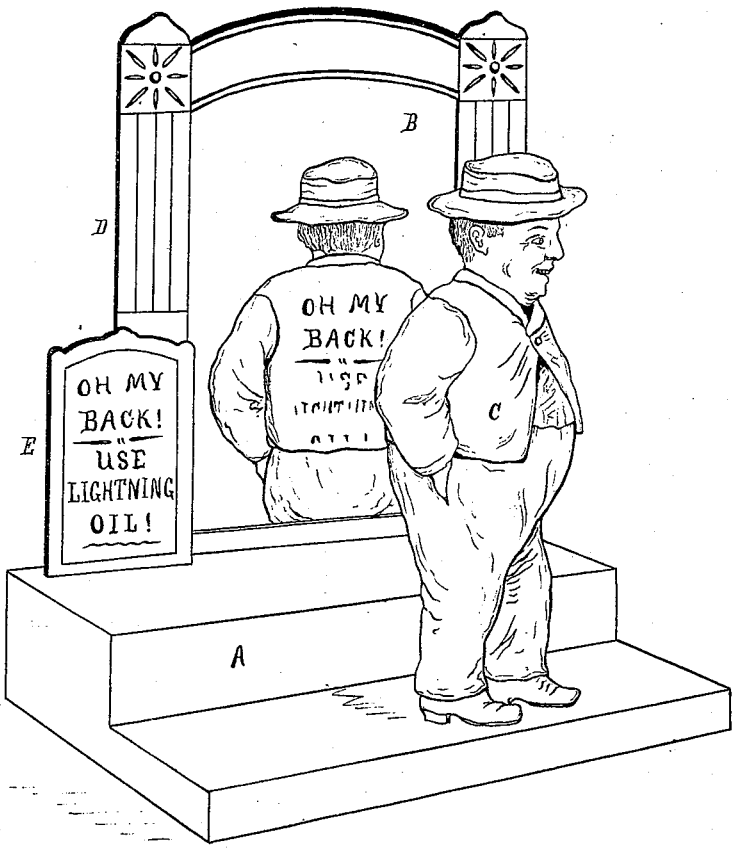
Witnesses:
Inventor:

UNITED STATES PATENT OFFICE.

EDWARD L. MORRIS, OF BOSTON, MASSACHUSETTS.

ADVERTISING DEVICE.

SPECIFICATION forming part of Letters Patent No. 253,087, dated January 31, 1882.

Application filed June 9, 1881. (No model.)

*To all whom it may concern:*

Be it known that I, EDWARD L. MORRIS, a citizen of the United States, residing at Boston, in the county of Suffolk and State of Massachusetts, have invented a new and useful Advertising Device, of which the following is a specification.

My invention relates to an advertising device; and it consists of the combination, upon the same pedestal, of a mirror and statue, or life-like figure, the device being adapted to contain an advertisement, and, further, of a peculiar arrangement of statue and mirror, by which a portion of the advertisement is reflected within the mirror, so as to be read by the beholder.

In the accompanying plate of drawings my invention is illustrated.

A is the base or pedestal, to which a mirror, B, and statue C are affixed, the statue being so arranged as to be reflected in part within the mirror.

Upon an extension, E, attached to the frame D of the mirror, an advertisement is inscribed; or it may be inscribed upon the representation of a box or barrel attached to the base conveniently to the mirror, or upon a portion of the base itself. The device being placed in a prominent position, the attention of passers is attracted by the novel combination of mirror and statue, curiosity on the part of the beholder leading him to inspect the advertisement inscribed.

The inscription upon the frame D may be varied as desired—as, for instance, "Oh, my back! This man uses lightning oil!"—the figure C being so placed as to reflect its ample proportions within the mirror. The figure C, the mirror B, and the inscription upon the frame D coact to render the advertisement complete.

In order to render the device further attractive, I place upon the back of the statue C an advertisement corresponding to a portion of that contained upon the frame D, but reversed, as though the figure had received the impression from leaning against the advertisement when fresh painted. This impression is reflected within the mirror, where it may be read again as upon the frame.

It will be seen that I produce a novel device in the combination of mirror and statue, and also in the arrangement of the figure so as to reflect its advertisement or inscription within the mirror.

What I claim, and desire to secure by Letters Patent, is—

An advertising device consisting of the mirror B, frame D, and base A, having thereon an advertisement, in combination with the statue C, arranged to be reflected within the mirror, substantially as described, and for the purpose set forth.

EDWARD L. MORRIS.

Witnesses:
WILLIAM F. GRIFFIN,
ALBERT SHOCK.